(No Model.)
E. E. WHIPPLE.
TIRE.
No. 537,793. Patented Apr. 16, 1895.
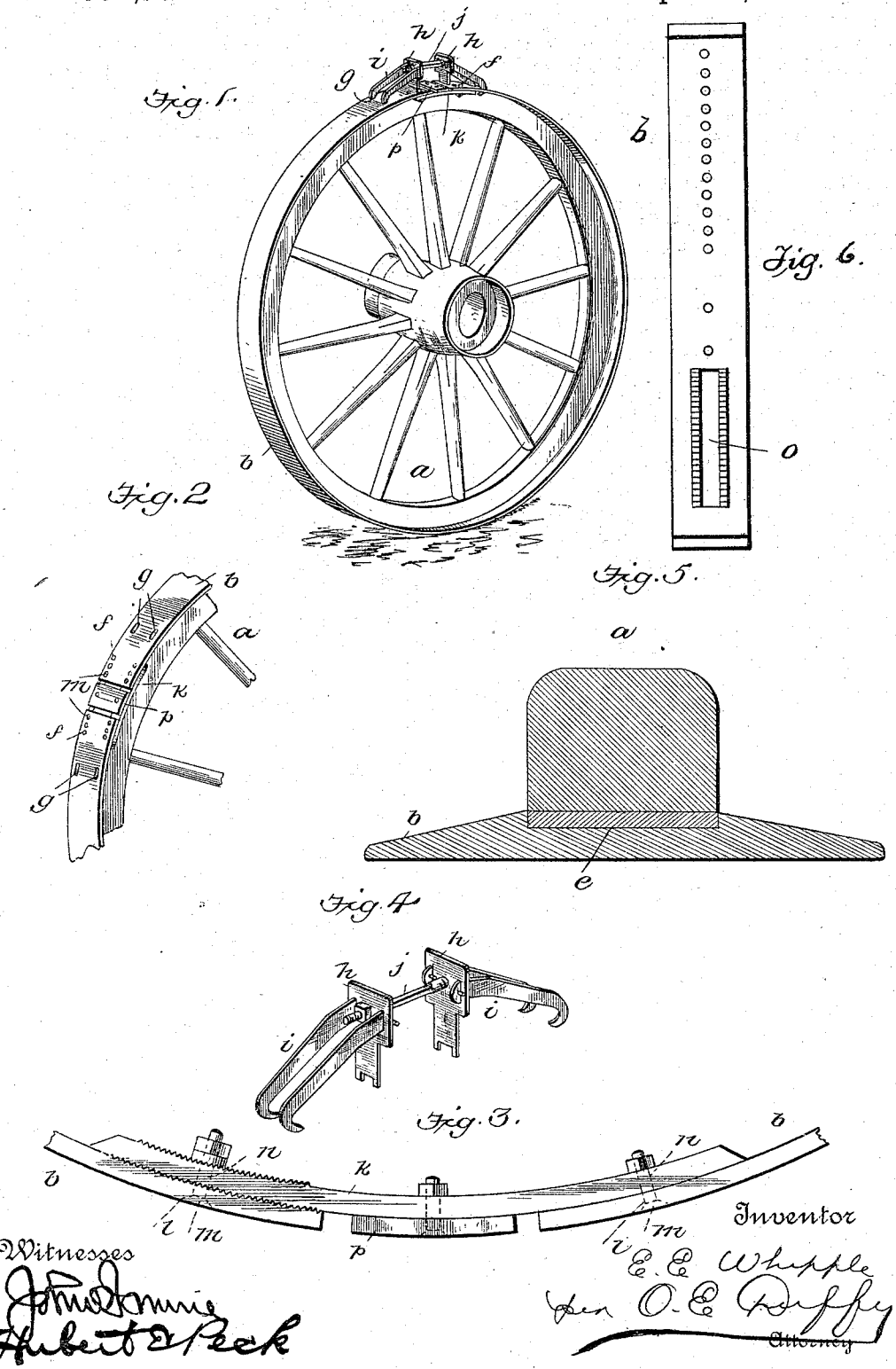
Witnesses
Inventor
E. E. Whipple
per O. E. Duffy
Attorney

UNITED STATES PATENT OFFICE.

EFFINGER E. WHIPPLE, OF ST. JOHN'S, MICHIGAN.

TIRE.

SPECIFICATION forming part of Letters Patent No. 537,793, dated April 16, 1895.

Application filed November 22, 1893. Serial No. 491,664. (No model.)

*To all whom it may concern:*

Be it known that I, EFFINGER E. WHIPPLE, of St. John's, in the county of Clinton and State of Michigan, have invented certain new and useful Improvements in Tires; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in vehicle tires, and more particularly to improvements in supplemental tires for vehicles.

The object of the invention is to provide supplemental tire for vehicles, exceedingly cheap, simple and durable in construction and composed of a minimum number of parts.

A further object of the invention is to provide improved means for drawing together the ends of supplemental tires and for securing the same.

The invention consists in certain novel features of construction and in combination of parts more fully and particularly pointed out hereinafter and mentioned in the claims.

Referring to the accompanying drawings: Figure 1, is a perspective view of a wheel provided with the improved supplemental tire, the means for drawing the ends of the tire together so that they can be fastened, being shown in operative position. Fig. 2, is a detail perspective view showing the ends of the tire fastened together and provided with an improved fillet, the tightener or drawing means being shown removed. Fig. 3, is an enlarged side elevation of the joints between the ends of the supplemental tire. Fig. 4 is a detail perspective view of the detachable means for drawing together the ends of the supplemental tire previously to fastening the same. Fig. 5 is a section through the wheel and tire showing the shape of the tire in cross section. Fig. 6 is a plan of a coupling plate.

The average run of factory wagon wheels, supposed to be of the same diameter, usually vary about one inch in diameter making them differ approximately three inches in circumference.

It is the object of this invention to provide an adjustable or supplemental tire that will fit various sizes of wheels and yet be smooth and round with no break, ridges or uneven joints on the outer side of the tire, whereby the tire will be at all times engaged and rest on the ground without flat places or breaks.

In the drawings the reference letter $a$, indicates a wagon wheel.

$b$, indicates the supplemental or adjustable tire adapted to be locked on the wagon wheel when desired to travel over soft ground or places where a very wide tread is desired.

The supplemental tire can be formed of suitable flat band metal and is preferably formed in one piece with the two ends arranged to be drawn together or as near together as possible. The supplemental tire is formed flat on the outer side or tread and on its inner side is provided with the central groove $e$, to receive the tire of the wheel. The inner side of the supplemental tire inclines or is beveled to the outer edges thereof from said groove so as to form the outwardly sloping edges that will cause sand or mud or the like to roll or fall from the inner surface of the tire and prevent it adhering thereto. This is a point of great advantage.

The central groove in the supplemental tire holds the tire against lateral movement on the wagon wheel.

Various means can be employed to couple the ends of the supplemental tire together. Figs. 1, 2, 3, and 6 show the preferred means for drawing the ends of the tire together and coupling them. In this construction the ends of the tire are provided with holes $f$, located near the extremities thereof. A distance back from the extremities each end of the supplemental tire is provided with a pin or slot $e$.

The tightener employed to draw the ends of the tire together consists of the two bridges or blocks $h$, respectively, removably resting on the outer sides of and inter-locking with the tire ends by means of lugs $h$, loosely fitting in the holes $f$, the upper portion of said bridges having right and left threaded apertures, or independent hubs outside of the bridges respectively, to receive the right and left threaded bolt $j$, connecting the two bridges. Said bridges are provided with the links $i$, having hooked ends arranged to catch in the slots e, of the tire so as to provide strong means to draw the tire ends together. By means of this construction when the tightener is fitted on the tire ends with the said hooks in the slots and the bolt is turned in the proper direction the tire ends are drawn together or as close together as possible to tightly draw the tire around the wheel. When the tire has been drawn to the desired degree of tightness the tire ends are rigidly united by means of one or more coupling plates k, bolted to and located on the inner surface of the tire ends.

Coupling plates e, should be a little more than flush with the edge of the tire and outside corners rounded. Then it is impossible for the corners or ends of the tire or fillet to catch on to the wagon box. When this has been done the bolts of the tightening device are loosened and the bridges and hooks are disengaged from the tire and removed.

The ends of the tire are provided with counter-sunk holes l, to receive the bolt m, passing through the tire ends and through the coupling plates e.

Holes l, in the tire are three-fourths of an inch center to center and holes n, in coupling plate one-half inch center to center or in that proportion. This is better than a slot as it is most certain. The coupling plates can be provided with series of bolt holes n, closely arranged so that the tire ends are drawn together. Bolt holes n, can be easily made to register with the bolt holes l, so that the bolts can be passed through and the tire rigidly secured.

If desired one end of each coupling plate can be provided with an elongated slot o, as shown, in which the coupling plate can be bolted to the one end of the tire with the slotted end thereof beneath the opposite end of the tire and the bolts loosely extending through the slots so that when the tire ends are drawn toward each other to desired points the nuts on the bolts can be tightened and the tire ends held. In this case the nut and coupling plates at the inner surface of the tire end are preferably corrugated or rough so as to prevent slipping.

In order to close the opening or space between the ends of the tire when they cannot be drawn together a fillet p is provided. In Figs. 1, 2, and 3, this fillet consists of a flat plate bolted or otherwise removably secured to the coupling plates so as to fill the space between the ends of the tire whereby there will be no break in the continuity of the supplemental tire. This fillet is removably secured to the coupling plate by suitable means as a bolt so that it can be removed when desired or when it is necessary to supply a large or small fillet. In the construction the coupling parts are located on opposite sides of the wheel felly with the fillet resting at its central portion of the wheel tire. With each supplemental tire a series of fillets can be supplied of various sizes so that the tire can be used on wheels of various diameters.

By the employment of a fillet the supplemental tire can be used on wheels of various sizes without having a flat portion or open space between the ends of the tire; also avoiding danger or bending in or breaking the ends of the tire as is the case where they are unsupported.

If desired the tire ends can be provided with inwardly extending lugs q, on their inner sides located on opposite sides of the space to be occupied by the wheel felly, these lugs being perforated to receive the tightening or coupling bolt r, passing through the lugs and provided with nuts or means to draw the tire together and hold it in the desired position.

It is evident that various changes might be made in the forms, arrangements and constructions of parts described without departing from the spirit and scope of my invention. Hence I do not wish to limit myself to the exact construction herein set forth, but consider myself entitled to all such changes that fall within the spirit and scope of my invention.

Having thus fully described my invention, what I claim as new, and desire to secure by Letters Patent of the United States, is—

1. The adjustable tire having the apertures in its ends, and the tightener comprising bridges removably located on said ends, and united by a bolt, and having the hooks or braces removably engaging said ends, as and for the purpose set forth.

2. The herein described tightener comprising the bridges arranged to removably engage the tire ends, united by a bolt arranged to draw the bridges toward each other, and the hooks carried by the bridges arranged to hook into the tire ends, substantially as described.

3. The herein described supplemental wide tire having the holes near the extremities of its ends to receive the bridges of a tire tightener, and having the slots a distance back from the extremities to receive the hooks of the bridges, and coupling means to unite said ends.

4. The herein described removable tire tightener for wide supplemental tires consisting of two heads or bridges formed to removably lock on the tire ends, drawing means, as a bolt, uniting said heads, and movable braces for each head arranged to removably grasp the tire, substantially as described.

5. The removable wide tire arranged to be clamped on and extend laterally beyond an ordinary wheel tire, the coupling plates on the inner surface of and uniting the ends of the wide tire and arranged on opposite sides of the wheel tire, and the fillet extending transversely between the wide tire ends on and projecting beyond the wheel tire and secured to said plates.

6. The removable wide supplemental tire for wheels having the adjustable coupling plates on the inner surfaces of and uniting its ends and arranged on opposite sides of the wheel tire, and the flat fillet plate between said ends resting against and extending beyond the wheel tire onto, and removably secured to, the coupling plates, substantially as described.

7. The wide supplemental tire, the coupling plates on the inner surfaces of the ends of said tire on opposite sides of the wheel tire, said plates having series of bolt holes at one portion and a longitudinal slot at the opposite portion, and bolts passing through the tire ends into said slots and holes, in the manner, substantially as set forth.

In testimony that I claim the foregoing as my own I affix my signature in presence of two witnesses.

EFFINGER E. WHIPPLE.

Witnesses:
   HANNAH M. WHIPPLE,
   M. MAUD WHIPPLE.